United States Patent Office 2,766,235
Patented Oct. 9, 1956

2,766,235

N-(β-ACETOXYETHYL)-N'-(CHLOROPHENO-THIAZINEPROPYL)PIPERAZINE

John W. Cusic, Skokie, Ill.

No Drawing. Application June 21, 1956,
Serial No. 592,745

1 Claim. (Cl. 260—243)

The present invention relates to a new group of piperazine derivatives and is especially concerned with N - (acetoxyalkyl)-N'-(halophenothiazinealkyl)pipera - zines. Applicant has found that the N-(acetoxyethyl)-N'-(2'-chloro-10'-phenothiazinepropyl)piperazine of the structural formula

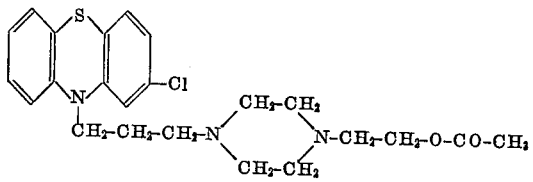

is an extremely potent anti-emetic and tranquilizing agent of very low toxicity. The potency of this acetate in producing ataraxia is approximately 10 times greater than that of the corresponding alcohol.

The piperazine depicted above forms pharmaceutically acceptable salts with a variety of inorganic and strong organic acids including sulfuric, phosphoric, hydrochloric, hydrobromic, sulfamic, citric, ascorbic, and related acids. It also forms quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The piperazine depicted above can be prepared by acetylation of the free alcohol. Alternatively, 2-chloro-10-(N-piperazinepropyl)phenothiazine can be condensed with a β-haloethyl acetate. Also a 2-chloro-10-(halopropyl)phenothiazine can be condensed with N-(acetoxyethyl)piperazine. Further, 2-chlorophenothiazine can be condensed with an N-(acetoxyethyl)-N'-(halopropyl)-piperazine.

The invention will appear more fully from the typical examples given below. However, the invention is not to be construed as limited thereby in spirit or in scope. Quantities of reagents are given as parts by weight.

Example 1

A mixture of 155 parts of 2-chloro-10-(γ-chloropropyl)phenothiazine, 75 parts of sodium iodide, 216 parts of piperazine and 2000 parts of butanone is refluxed for 8 hours, concentrated and extracted with dilute hydrochloric acid. The extract is rendered alkaline by addition of dilute potassium carbonate and extracted with ether. This ether extract is washed with water, dried over anhydrous potassium carbonate, filtered and evaporated. Vacuum distillation at 0.1 mm. pressure yields 2-chloro-10-(γ-piperazinopropyl)phenothiazine at about 214–218° C.

A mixture of 50 parts of the distillate, 25.6 parts of β-bromoethyl acetate, 10.7 parts of potassium carbonate and 400 parts of toluene is stirred at reflux temperature for 16 hours. The mixture is treated with water. The organic layer is separated, washed with water and extracted with dilute hydrochloric acid. The resulting extract is washed with benzene, rendered alkaline and extracted with benzene. The resulting benzene solution is dried over anhydrous potassium carbonate, filtered and concentrated. The residue is dissolved in 300 parts of ethanol and treated with 2.2 equivalents of a 25% solution of anhydrous hydrochloric acid in 2-propanol. The resulting crystals are recrystallized from 400 parts of ethanol and 10 parts of water. The dihydrochloride of N - (β - acetoxyethyl) - N'-[γ-(2'chloro-10'-phenothiazine)propyl]piperazine melts unsharply at about 200–230° C.

Example 2

A stirred mixture of 500 parts of 2-chloro-10-[γ-(N-piperazine)propyl]phenothiazine, 192 parts of β-bromoethanol, 211 parts of potassium carbonate and 35 parts of toluene is refluxed for 5 hours. The mixture is treated with water and benzene and the organic layer is separated, washed with water and benzene, dried over anhydrous potassium carbonate, filtered and evaporated. The residue is distilled at 214–218° C. and 0.15 mm. pressure to yield N-(β-hydroxyethyl)-N'-[γ-(2'-chloro-10'-phenothiazine)propyl]piperazine.

To a stirred solution of 95.5 parts of the distillate in 600 parts of chloroform is added a solution of 17.3 parts of acetyl chloride in 150 parts of chloroform, while the reaction vessel is cooled with ice. After 10 minutes stirring there are added slightly more than two equivalents of a 25% solution of hydrogen chloride in anhydrous 2-propanol. After removal of a portion of the solvent, partial precipitation occurs. Butanone is added to complete the precipitation. The product is collected on a filter. The dihydrochloride thus obtained has the same properties as the product of the first example.

What is claimed is:

N - (acetoxyethyl) - N' - (2' - chloro - 10' - phenothiazinepropyl)piperazine.

No references cited.